Oct. 7, 1969   H. GEISTHOFF ET AL   3,470,712
WIDE-ANGLE CONSTANT VELOCITY UNIVERSAL JOINT
Filed Jan. 15, 1968                                5 Sheets-Sheet 1

INVENTORS
HUBERT GEISTHOFF
HEINRICH WELSHOF
HUBERT GROSSE-ENTRUP

BY Edmund M. Jankiewicz
ATTORNEY

Oct. 7, 1969     H. GEISTHOFF ET AL     3,470,712
WIDE-ANGLE CONSTANT VELOCITY UNIVERSAL JOINT
Filed Jan. 15, 1968     5 Sheets-Sheet 5

INVENTORS
HUBERT GEISTHOFF
HEINRICH WELSHOF
HUBERT GROSSE-ENTRUP

BY Edmund M. Jaskiewicz
ATTORNEY 3,470,712
WIDE-ANGLE CONSTANT VELOCITY
UNIVERSAL JOINT
Hubert Geisthoff, Donrath, Hans-Heinrich Welshof, Geber, and Hubert Grosse-Entrup, Albach Post Franzhauschen, Germany, assignors to Firma Walterscheid K.G., Siegburg, Germany, a corporation of Germany
Filed Jan. 15, 1968, Ser. No. 697,761
Int. Cl. F16d 3/34
U.S. Cl. 64—21                                        10 Claims

ABSTRACT OF THE DISCLOSURE

A universal joint wherein a double Hooke's joint has the cross members pivotally connected to flanged fork members whose flanges are fastened together so as to slidably enclose a centering plate having opposed cylindrical recesses in which are slidably received ball head extensions mounted on the respective yokes of the double joint.

---

The present invention relates to a wide angle universal joint comprising a double Hooke's joint, more particularly, to the intermediate connection between the yokes of the double joint.

A well-known form of a universal joint is the Hooke's joint or, as it is sometimes known, the Cardan joint. In order to form a constant velocity joint or coupling, two of said joints are connected through an intermediate shaft or connection. However, the generally used form of a double Hooke's joint has the disadvantage that when the two coupled shafts are at relatively large angles of deflection, the coupling is unable to transmit a constant velocity. Many forms of wide-angle universal joints have been devised in attempts to transmit constant velocity at the widest angles of deflection between the shafts coming into the joint.

One such form of a universal joint comprises a double Hooke's joint in which the two cross members are centered with respect to each other by an interposed ball. However, it has been found that at relatively large angles of deflection this joint will not transmit constant velocity. In a modification of a double Hooke's joint the two cross members are relatively centered by two balls and a centering plate. While this joint is relatively accurate in transmitting a velocity ratio of 1 this joint is not capable of permitting large deflection angles between the coupled shafts.

It is therefore the principal object of the present invention to provide a novel and improved wide-angle constant velocity universal joint.

It is another object of the present invention to provide a universal joint having an improved intermediate connection between a double Hooke's joint so that the joint will transmit a constant velocity at wide angles of deflection.

It is a further object of the present invention to provide a wide-angle constant velocity universal joint which is simple in construction so as to be capable of a long operating life with a minimum of maintenance.

The objects of the persent invention are achieved and the disadvantages of the prior art are eliminated by the universal joint according to the present invention. In one embodiment of this universal joint the shafts which are to be connected each have a yoke at their cooperating ends with each being provided with a cross member as known in the art. A pair of flanged forks have their flanges bolted together and define an annular gap between the bolted forks. A centering plate is slidably mounted within the annular gap and a pair of flat annular rings are disposed within the gap on both sides of the centering plate. On the opposed faces of the centering plate there are provided axially extending cylindrical recesses which slidably receive ball-head extensions attached to each of the shaft yokes.

The wide-angle universal joint according to the present invention will transmit a constant velocity up to maximum deflection angles of 80 to 90 degrees. The relatively simple design of this universal joint greatly facilitates its fabrication and provides for relatively inexpensive manufacturing cost. The joint is compact and can be readily accomodated in a wide variety of structures. Servicing of the joint is is also facilitated since the worn parts can be readily replaced. In addition, the construction of this joint virtually eliminates any malfunctioning during operation even at wide angles of deflection.

Other objects and advantages of the present invention will be apparent upon reference to accompanying description when taken in conjunction with the following drawings wherein.

Proceeding next to the drawings wherein like reference symbols indicate the same parts throughout the various views a specific embodiment and several modifications of the present invention will be described in detail.

Figure 1:
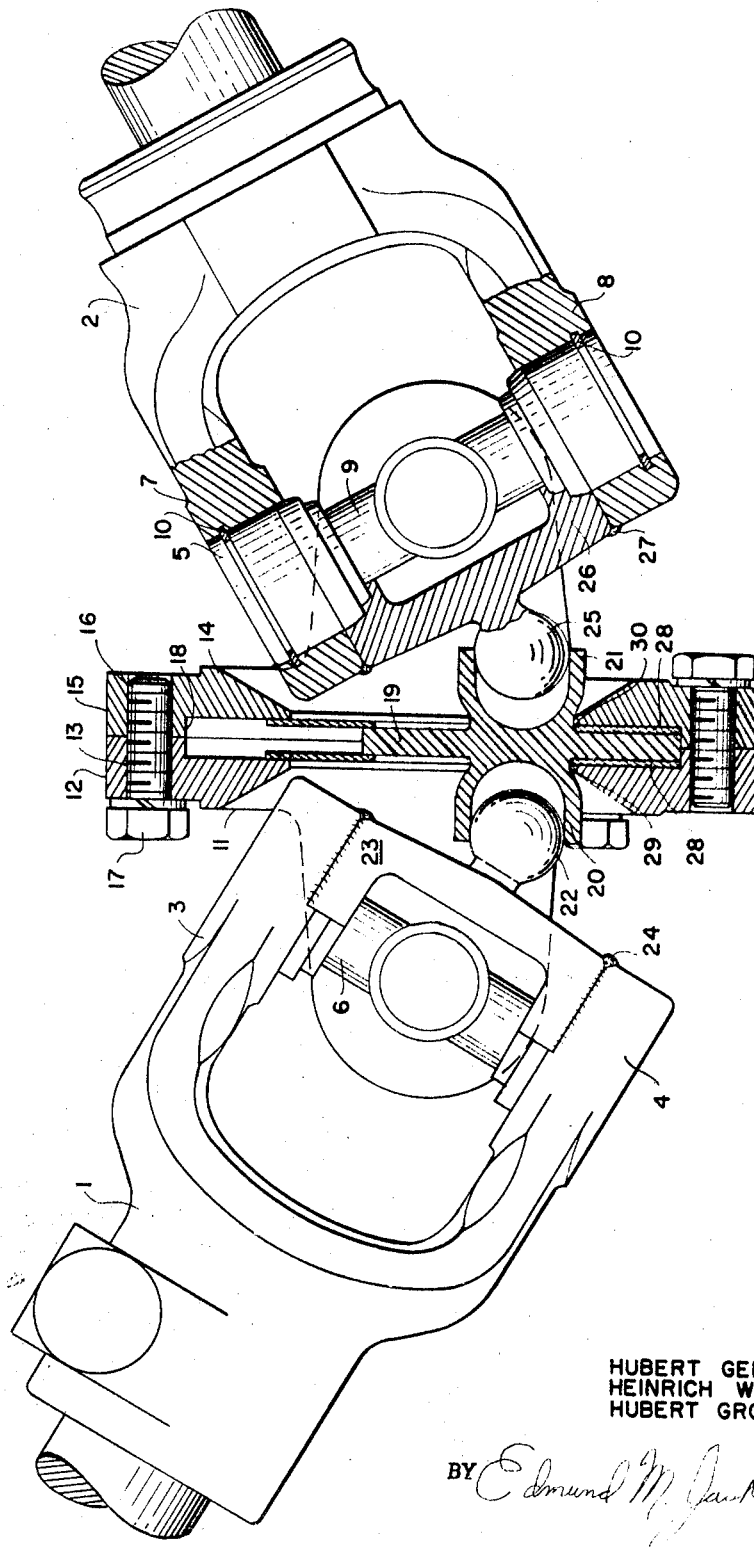
FIG. 1 is a side view partially in section of the wide-angle universal joint according to the present invention in a deflected or angular position.
Figure 2:
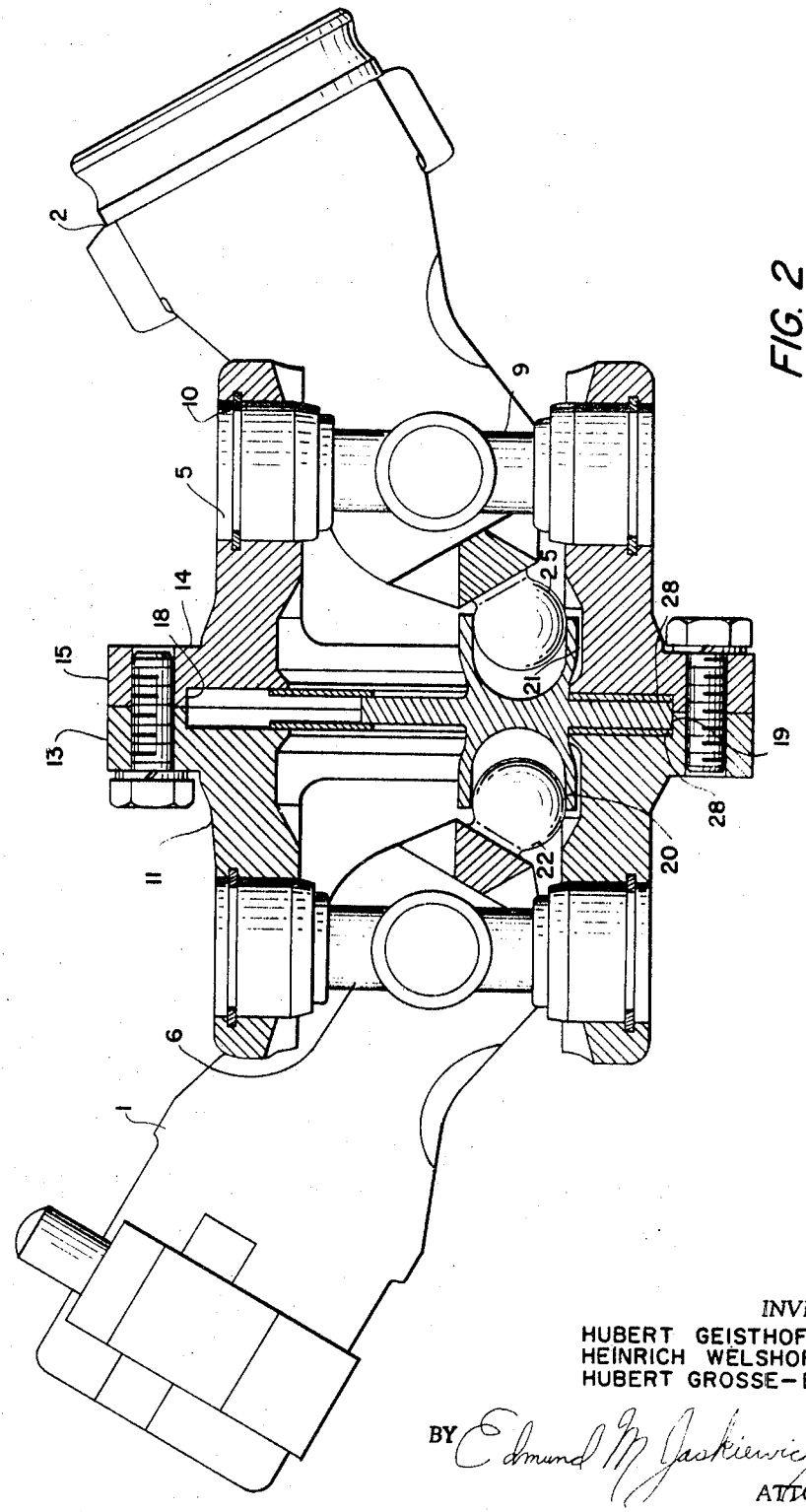
FIG. 2 is a view similar to that of FIG. 1 with the joint at the same deflected position but being rotated 90 degrees.

As may be seen in FIG. 1 the shafts to be connected by means of the universal joint have yokes 1 and 2 mounted on their ends thereof by splines or other suitable connection. Yoke 1 is provided with arms 3 and 4 with bores 5 therein in which is pivotally mounted a cross member or spider 6.

Yoke 2 is similarly provided with arms 7 and 8 having bores 5 therein in which is pivotally mounted a cross member 9. The cross members are retained in their respective yokes by spring rings 10.

The free ends or arms of cross member 6 are pivotally mounted in a fork member 11 having a flange 12 with a plurality of bolt holes therein. In a similar manner the cross member 9 has its free ends pivotally mounted in a like fork member 14 having a flange 15 with corresponding bolt holes 16. The flanges are fastened together as shown in the drawing by means of bolts or screws 17 and, when fastened, form an annular gap 18 therebetween.

Slidably mounted within the annular gap or space 18 is a centering plate 19 which is provided with a pair of tubular bosses 20 and 21 extending axially from the opposed faces of the centering plate 19. The bosses define sockets which are perpendicular from the centering plate.

Yoke 1 carries a ball-head extension 22 which extends axially outwardly from a web 23 welded to the yoke as indicated at 24. Similarly yoke 2 is provided with a ball-head extension 25 extending axially from a web 26 welded to the yoke 2 at 27.

Also, slidably contained in the annular space 18 is a pair of flat annular rings 28 positioned on opposite sides of centering plate 19. The inner and outer diameters of the rings 28 are so related to the diameters of the annular space 18 and centering plate 19 that the space or gap is closed or sealed to the outside in all positions of displacement of the centering plate.

The cylindrical or tubular sockets 20 and 21 on the centering plate 19 are provided with annular recesses 29 and 30 respectively at the bases thereof. The annular recesses enable the external or outer diameter of the flange fork members 11 and 14 to be maintained within moderate limits for maximum deflection angles of the two shafts.

It is pointed out that the ball-headed extensions 22 and 25 are slidably received in the cylindrical sockets 20 and 21. The web members 23 and 26 which carry the ball-headed extensions are welded on the outer ends of yokes 1 and 2. As a result of this construction the joint can be assembled from a minimum of separate parts.

It will be apparent that during the operation of this universal joint when power is transmitted from one shaft to the other the twin fork members 11 and 14 will always be forced into a center position with respect to the shaft yokes 1 and 2. The ball-headed extensions on the yokes 1 and 2 slidably cooperating with the cylindrical sockets on the centering plate, will insure that the flanges 12 and 15 of the fork members will always be exactly bisect the angle between yokes 1 and 2. This will insure constant velocity transmission regardless of the deflection angle between the two shafts. During the rotation of these shafts, the centering plate will slide back and forth in the annular gap between the flanges of the fork member. At the same time, the rings 28 will form a seal between this gap and the exterior.

The rings 28 are constructed as wearing members and will therefore prevent excessive wear of the fork members and of the centering plate. The centering plate and its associated rings can be readily replaced by removing the bolts 17 to disconnect the flanged fork members.

It is apparent that universal joint according to the present invention comprises a relatively small number of components which are easy to fabricate.

According to the teachings of the present invention the fork members, particularly the diameters of the flanges, and the yokes 1 and 2 may be so constructed that the maximum deflection angle of this joint can be increased considerably beyond the angle illustrated in the drawings. This universal joint can readily operate at a deflection angle of as much as 90 degrees while still providing a constant velocity transmission between the yokes of the joint.

Figure 3:
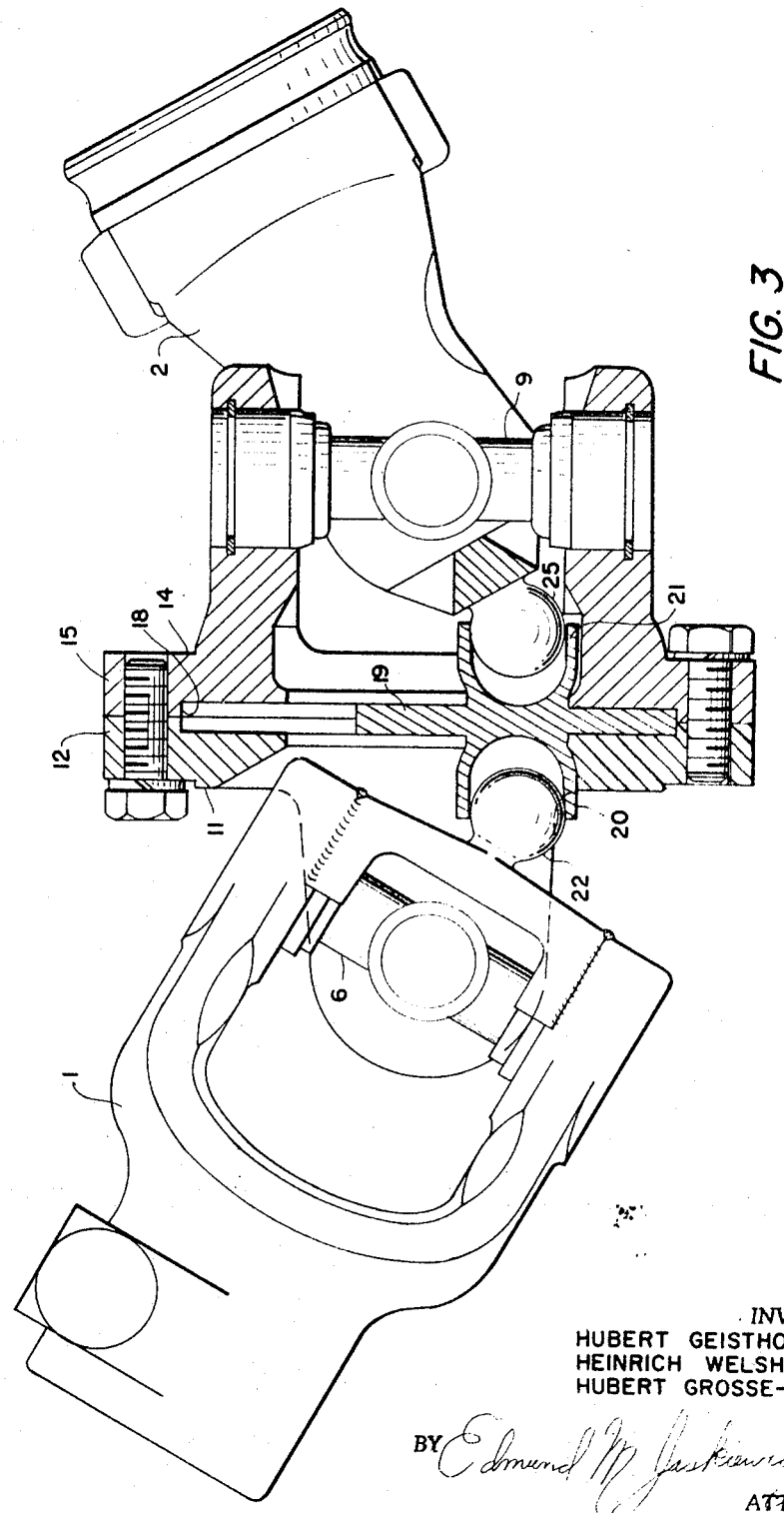
FIG. 3 is a view similar to that of FIG. 1 showing a modification of the present joint wherein the flanged forks are bolted in an unsymmetrical position.

In FIG. 3 there is illustrated a modification of the present universal joint wherein the fork members 11 and 14 are rotated 90 degrees with respect to each other and their flanges 12 and 15 then fastened together. The resulting center yoke structure comprising the fork members may be described as being unsymmetrical since the forks or lugs are displaced 90 degrees with respect to each other.

This modification of FIG. 3 is also illustrated with the wearing rings 28 being removed. It will be apparent that the present universal clutch will function equally well with or without the wearing rings, but that the wearing rings will close off the annular space from the exterior and thus prevent the entry of dirt to the cooperating surfaces of the flanges and centering plate.

Figure 4:
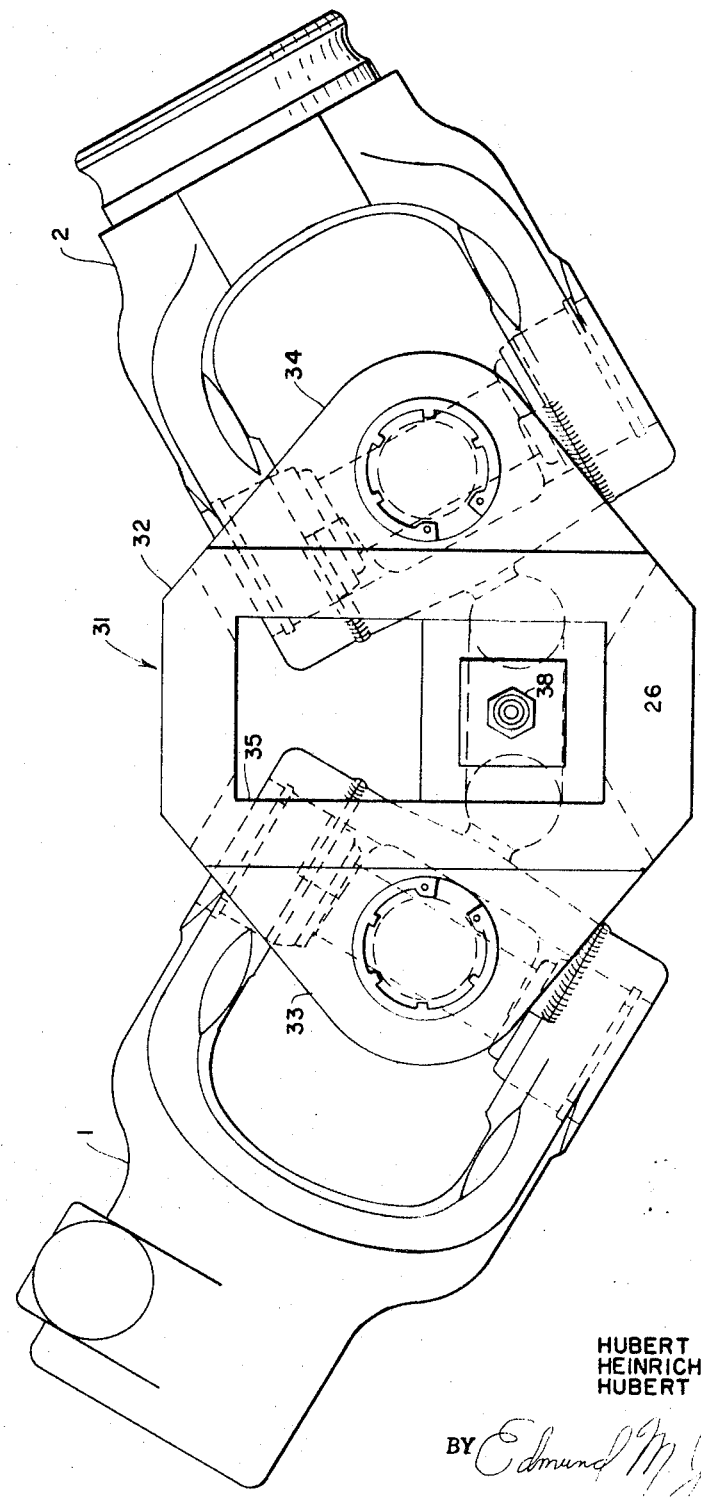
FIG. 4 is a side view similar to that of FIG. 1 but showing a further modification of the double center yoke structure employed in interconnecting the outer yokes.
Figure 5:
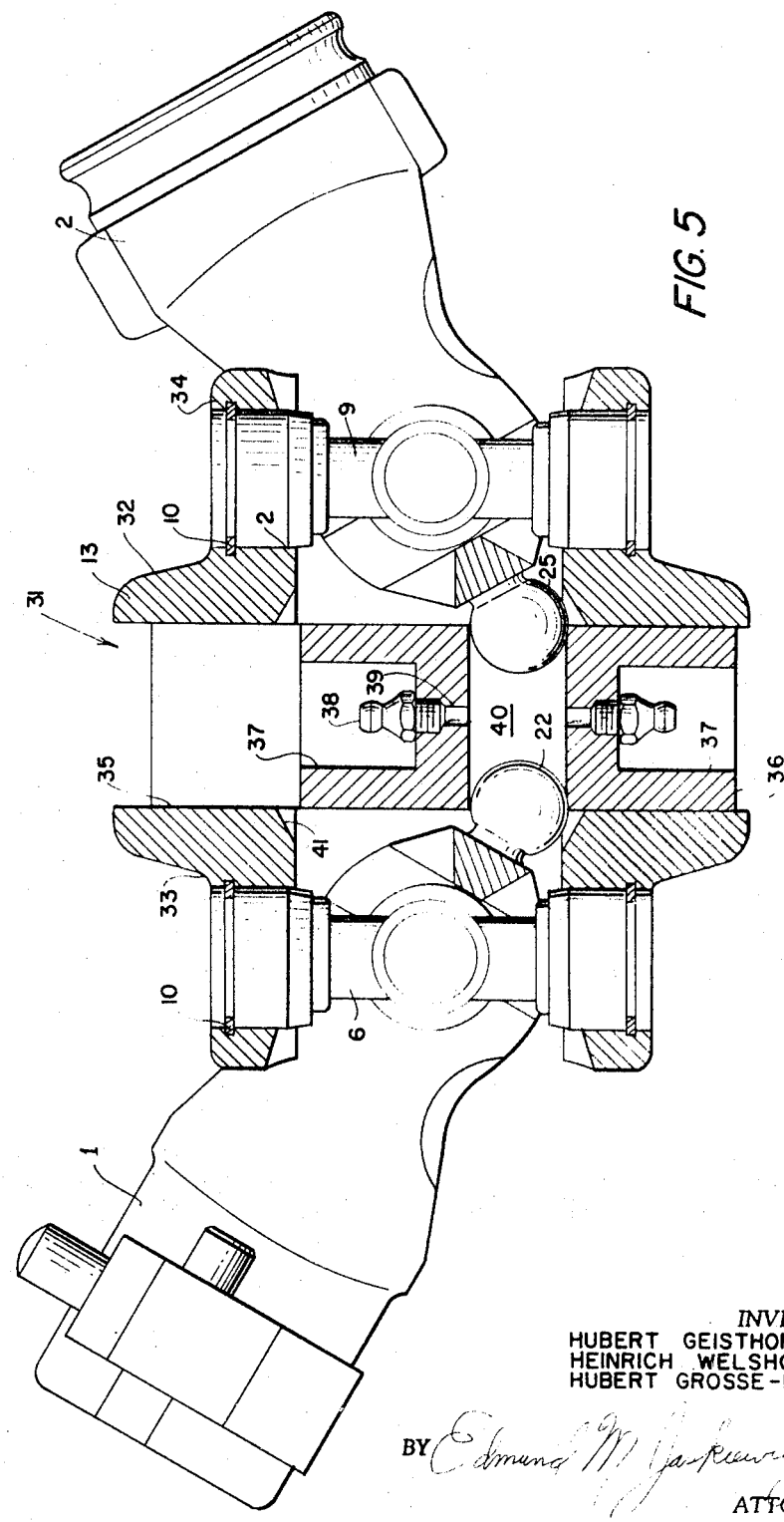
FIG. 5 is a similar view to that of FIG. 4 of the modification illustrated therein but partially in section and showing the joint rotated 90 degrees.

In FIGS. 4 and 5 there is illustrated a further modification of the present invention wherein the center yoke structure is comprised of a unitary member instead of the flanged fork members of the embodiment as described above. In this modification the center yoke structure is indicated generally at 31 and comprises a body portion 32 from which two pairs of lugs 33 and 34 extends in opposite directions. The free ends of the cross members 6 and 9 are similarly pivotally connected in these lugs and retained in place by the spring rings 10.

A central opening 35 is formed in the body portion and a centering member 36 is slidably mounted therein. The centering member is provided with opposed recesses 37 in which are positioned lubrication fittings 38 communicating with lubrication channels 39 to provide lubrication to a central bore 40. The bore 40 opens to the opposed faces of centering members 36 and slidably receives the ball-head extensions 22 and 25 as described above.

It will be apparent that the opposed faces of centering member 36 slide over the faces of the opening 35 in a manner analogous to that of centering plate 19 sliding in the annular gap 18 of the embodiment illustrated in FIG. 1. The universal joint of FIGS. 4 and 5, therefore, functions in the same manner as the embodiment of the universal joint described above.

The inner surface of the lugs 33 and 34 adjacent the opening 35 may be beveled as shown at 41 in order to permit greater freedom of movement of the yokes 1 and 2 during the operation of the universal joint.

Thus it can be seen that the present invention has disclosed a wide-angle constant velocity universal joint which is simple and compact in construction and can be readily serviced to replace the worn parts. The ball and socket connection between the shaft yokes and the centering member will insure that equal angles will be formed between the centering member and the respective shaft yokes in all angular positions of the shafts. This relationship will result in the transmission of constant velocity for all angular deflections of the shafts. This universal joint will permit angular shaft deflections up to about 90 degrees. At this maximum deflection this constant velocity will still be transmitted.

It will be understood that this invention is susceptible to modification in order to adapt it to different usages and conditions and, accordingly, it is desired to comprehend such modifications within this invention as may fall within the scope of the appended claims.

What is claimed is:

1. In a universal joint, a pair of yokes with each yoke having a cross member therein, means defining a pair of oppositely disposed fork members with each fork member being pivotally connected to one of said cross members, a centering member slidably mounted between said fork members and having opposed faces directed toward the respective yokes, means on the opposed faces of said centering member for defining axially extending cylindrical recesses thereon, and a ball-head extension on each of said yokes with said ball-heads being slidably received within said cylindrical recesses to provide an intermediate connection between said yokes through said centering member.

2. In a universal joint as claimed in claim 1, with said fork members being fastened together and means on said fork members for defining an annular space therebetween, said centering member being positioned in said annular space.

3. In a universal joint as claimed in claim 1 with each of said fork member having a flange with said flanges being fastened together.

4. In a universal joint as claimed in claim 1 with said recess defining means comprising a tubular boss extending perpendicularly to said centering member.

5. In a universal joint as claimed in claim 2, and further comprising a pair of flat annular rings within said annular space on both sides of said centering member, the inner and outer diameters of said rings being such that said annular space is closed from the exterior in all positions of said centering member.

6. In a universal joint as claimed in claim 4 with each of said tubular bosses having an annular recess at the base thereof.

7. In a universal joint as claimed in claim 1 with said ball head extensions each comprising a web attached to the outer end of its respective yoke.

8. In a universal joint as claimed in claim 3 with said flanged fork members being symmetrically disposed with respect to each other.

9. In a universal joint as claimed in claim 1 with said centering member having a bore therethrough to define said opposed cylindrical recesses so that said recesses are in communication with each other.

10. In a universal joint as claimed in claim 9 and further comprising means on said centering member for lubricating said bore between said slidably received ball head extensions.

References Cited

UNITED STATES PATENTS

| 724,068 | 3/1903 | Williams | 64—2 |
| 1,979,768 | 11/1934 | Pearce | 64—2 |
| 2,755,641 | 7/1956 | Dunn | 64—2 |

FOREIGN PATENTS

| 1,265,194 | 5/1961 | France. |

HALL C. COE, Primary Examiner